United States Patent
Lu (10) Patent No.: US 12,408,007 B2
(45) Date of Patent: Sep. 2, 2025

(54) USER EQUIPMENT AND BASE STATION FOR IMPLEMENTING FEEDBACK ASSISTED MULTICAST

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 358 days.

(21) Appl. No.: 17/834,964

(22) Filed: Jun. 8, 2022

(65) Prior Publication Data

US 2022/0303732 A1    Sep. 22, 2022

Related U.S. Application Data

(63) Continuation of application No. PCT/CN2020/129457, filed on Nov. 17, 2020.
(Continued)

(51) Int. Cl.
*H04W 4/06*    (2009.01)
*H04L 1/1812*    (2023.01)
(Continued)

(52) U.S. Cl.
CPC .......... *H04W 4/06* (2013.01); *H04L 1/1816* (2013.01); *H04L 5/0055* (2013.01); *H04W 76/40* (2018.02); *H04L 2001/0093* (2013.01)

(58) Field of Classification Search
CPC ........... H04W 56/005; H04W 56/00; H04W 72/1268; H04W 74/0833; H04W 74/0841;
(Continued)

(56) References Cited

U.S. PATENT DOCUMENTS 11,303,392 B2 *   4/2022   Sun ................ H04L 1/1893
2010/0309836 A1 * 12/2010   Sugawara ........ H04W 72/542
                                             370/312
(Continued)

FOREIGN PATENT DOCUMENTS

CN    101388755    3/2009
CN    101472224    7/2009
(Continued)

OTHER PUBLICATIONS

"Office Action of China Counterpart Application, Application No. 202210802535.5", with English translation thereof, issued on Dec. 26, 2023, p. 1-p. 20.
(Continued)

*Primary Examiner* — Nathan S Taylor
(74) *Attorney, Agent, or Firm* — Hodgson Russ LLP (57) ABSTRACT

The disclosure is directed to a user equipment and a base station for implementing a feedback assisted multicast. In an aspect, the disclosure is directed to a UE which includes not limited to a transmitter, a receiver, and a hardware processor coupled to the transmitter and the receiver and configured to establish a MBMS connection for receiving a MBMS data, receive, through the receiver, the MBMS data after establishing the MBMS connection, determine a feedback resource based on receiving the MBMS data, and transmit, through the transmitter, a feedback message to indicate a reliability of the MBMS connection by using the feedback resource.

8 Claims, 7 Drawing Sheets

Related U.S. Application Data (60) Provisional application No. 62/945,963, filed on Dec. 10, 2019.

(51) Int. Cl.
*H04L 5/00* (2006.01)
*H04W 76/40* (2018.01)
*H04L 1/00* (2006.01)

(58) Field of Classification Search
CPC . H04W 74/0866; H04W 74/08; H04W 72/12; H04W 4/06; H04W 76/40; G01S 13/003; G01S 13/765; G01S 13/767; G01S 13/87; G01S 13/00; G01S 13/76; G01S 5/02; H04L 43/0864; H04L 1/0003; H04L 1/0009; H04L 1/0026; H04L 1/1816; H04L 1/1822; H04L 1/1861; H04L 12/1868; H04L 2001/0093; H04L 5/0055; H04L 1/18; H04L 5/00
See application file for complete search history.

(56) References Cited

U.S. PATENT DOCUMENTS

| | | | | |
|---|---|---|---|---|
| 2014/0003320 | A1* | 1/2014 | Etemad | H04W 4/08 370/312 |
| 2014/0226552 | A1* | 8/2014 | Niu | H04W 4/06 370/312 |
| 2014/0355493 | A1* | 12/2014 | Niu | H04L 12/189 370/312 |
| 2018/0367261 | A1* | 12/2018 | Gonzalves Serrano | H04L 1/1812 |
| 2019/0098604 | A1* | 3/2019 | Park | H04W 72/27 |
| 2020/0323023 | A1* | 10/2020 | Miao | H04W 76/14 |
| 2020/0351933 | A1* | 11/2020 | Nam | H04W 72/23 |
| 2020/0357933 | A1* | 11/2020 | Okano | H01L 27/146 |
| 2020/0396040 | A1* | 12/2020 | Miao | H04W 4/40 |
| 2021/0297199 | A1* | 9/2021 | Miao | H04L 1/189 |
| 2021/0306824 | A1* | 9/2021 | Li | H04W 72/02 |
| 2021/0345071 | A1* | 11/2021 | Takeda | H04L 1/1822 |
| 2022/0124463 | A1* | 4/2022 | Zhang | H04W 4/06 |
| 2022/0201757 | A1* | 6/2022 | Cruz | H04L 1/1896 |
| 2022/0360950 | A1* | 11/2022 | Li | H04L 1/1854 |
| 2023/0022087 | A1* | 1/2023 | Cao | H04L 1/1887 |
| 2023/0054043 | A1* | 2/2023 | Zhou | H04W 76/40 |
| 2023/0345509 | A1* | 10/2023 | Kadiri | H04W 72/30 |

FOREIGN PATENT DOCUMENTS

| | | |
|---|---|---|
| WO | 2018056108 | 3/2018 |
| WO | 2018236117 | 12/2018 |

OTHER PUBLICATIONS

"3rd Generation Partnership Project; Technical Specification Group Radio Access Network; Introduction of the Multimedia Broadcast/Multicast Service (MBMS) in the Radio Access Network (RAN); Stage 2 (Release 15)", 3GPP TS 25.346 V15.0.0, Jun. 2018, pp. 1-71.

"3rd Generation Partnership Project; Technical Specification Group Services and System Aspects; Multimedia Broadcast/Multicast Service (MBMS); Stage 1 (Release 16)", 3GPP TS 22.146 V16.0.0, Jul. 2020, pp. 1-18.

"3rd Generation Partnership Project; Technical Specification Group Services and System Aspects; Multimedia Broadcast/Multicast Service (MBMS); Architecture and functional description (Release 15)", 3GPP TS 23.246 V15.1.0, Sep. 2019, pp. 1-77.

Huawei, "New Work Item on NR support of Multicast and Broadcast Services", 3GPP TSG RAN Meeting #86 RP-193248, Dec. 2019, pp. 1-10.

"International Search Report (Form PCT/ISA/210) of PCT/CN2020/129457," mailed on Feb. 19, 2021, pp. 1-4.

"Written Opinion of the International Searching Authority (Form PCT/ISA/237) of PCT/CN2020/129457," mailed on Feb. 19, 2021, pp. 1-4.

"Office Action of China Counterpart Application, Application No. 202210802535.5", with English translation thereof, issued on Jun. 3, 2023, p. 1-p. 15.

"Search Report of of counterpart Europe application No. 20899730.4", issued on Oct. 27, 2022, p. 1-p. 10.

"Office Action of China Counterpart Application, Application No. 202210802535.5", with English translation thereof, issued on May 19, 2024, p. 1-p. 16.

* cited by examiner

USER EQUIPMENT AND BASE STATION FOR IMPLEMENTING FEEDBACK ASSISTED MULTICAST

CROSS-REFERENCE TO RELATED APPLICATION

This application is a continuation of international PCT application serial no. PCT/CN2020/129457, filed on Nov. 17, 2020, which claims the priority benefits of U.S. provisional application Ser. No. 62/945,963, filed on Dec. 10, 2019. The entirety of each of the above-mentioned patent applications is hereby incorporated by reference herein and made a part of this specification.

BACKGROUND

Technical Field

The disclosure is directed to a user equipment and a base station for implementing a feedback assisted multicast.

Description of Related Art

Figure 1:
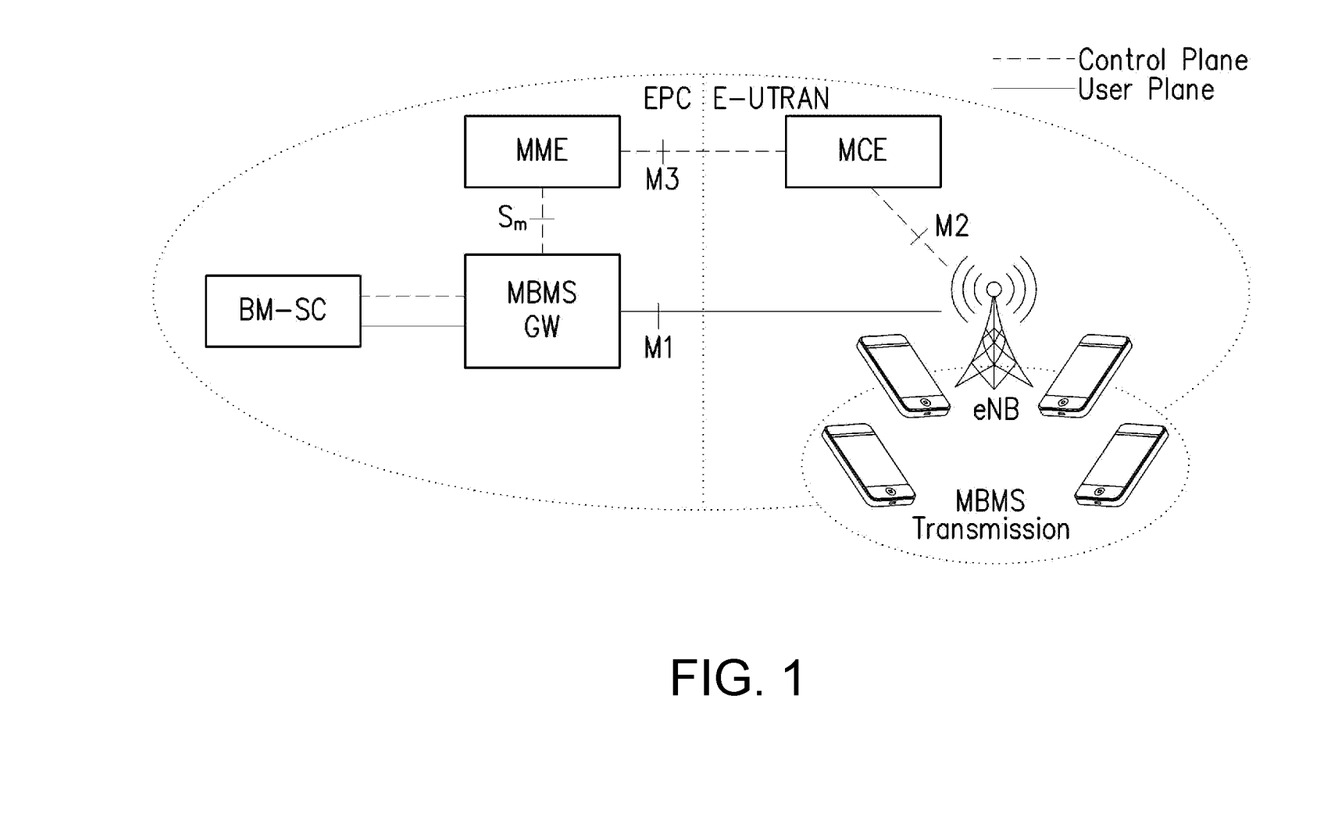
FIG. 1 shows a conceptual diagram of a network architecture for implementing MBMS in an LTE communication system.

A unicast refers to one transmitter device transmitting information unilaterally to one receiver device, and a multicast refers to one transmitter device transmitting information multilaterally to multiple receiver devices. For a wireless communication system such as the Long-Term Evolution (LTE) system and beyond, the Multimedia Broadcast Multicast Service (MBMS) as well as the more advanced versions has both unicast and multicast capabilities. FIG. 1 shows a conceptual diagram of a network architecture for implementing MBMS in a LTE communication system in which the evolved Node B (eNB) in a radio access network (RAN) would receive multimedia data from an evolved packet core network (EPC) and subsequently deliver the multimedia data to at least one user equipment (UE) by using the unicast or the multicast functions defined in the MBMS or related standards.

Figure 2:
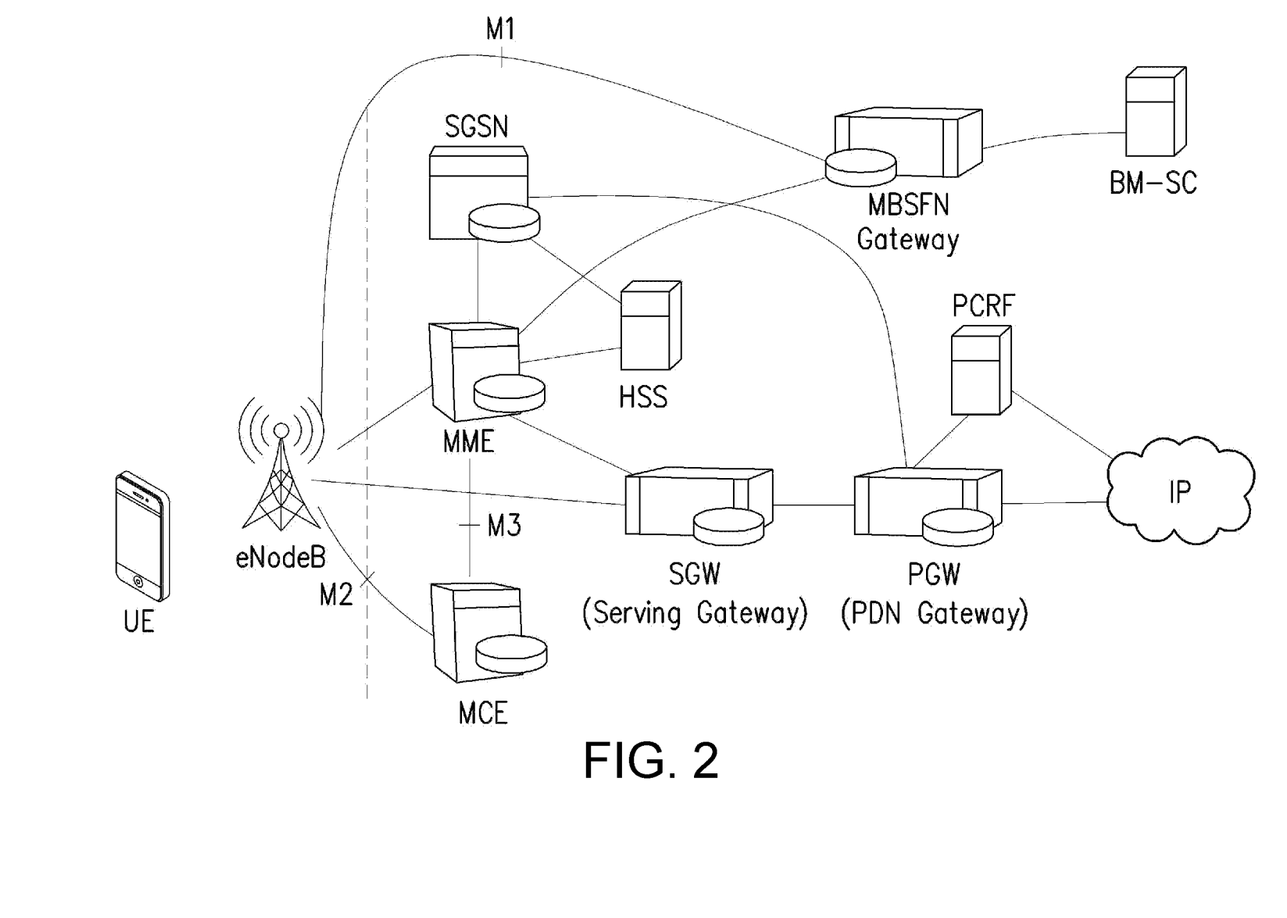
FIG. 2 shows a conceptual diagram of a network architecture for implementing e-MBMS in an LTE communication system.

Similar to FIG. 1 as previously shown, FIG. 2 shows a conceptual diagram of a network architecture for implementing enhanced MBMS (e-MBMS) in an LTE communication system. For both MBMS and e-MBMS, the eNB may receive control signaling from the M2 control plane interface and user data from the M1 user plane interface, and the eNB may subsequently deliver multimedia data to multiple UEs by using the multicast or related functions. The functions and architectures related to MBMS and e-MBMS are currently known, and detailed descriptions of these functions and architectures have been recorded in various wireless communication standards and thus a detailed description would not be necessary.

The multicast functions of MBMS and its related services are different from typical unicast functions in the way that, since the multicast transmissions are from one transmitter to multiple receivers, it would not be straight forward to expect feedbacks from multiple receivers. For the example of FIG. 1 as previously described, as the eNB multicasts multimedia data to multiple UEs, there is no established method for the UEs to transmit feedback messages to the eNB since the LTE communication system has not specified a feedback mechanism for the MBMS and beyond. Therefore, the LTE communication system has to rely on autonomous re-transmissions and link adaptations to ensure its reliability.

However, without receiving feedbacks from UEs, it might not be sufficiently reliable for the eNB to keep relying on autonomous re-transmissions and link adaptations since doing such may either cause unnecessary re-transmissions or inaccurate uses of the modulation coding scheme (MCS) as the MCS level being too low would result in a waste of transmission resources and the MCS level being too high would result in higher data losses. Therefore, it could be helpful for the current and future communication systems to implement a feedback function for multicast services such as MBMS or e-MBMS.

SUMMARY

Accordingly, the disclosure is directed to a user equipment and a base station for implementing a feedback assisted multicast.

In an aspect, the disclosure is directed to a UE which includes not limited to a transmitter, a receiver, and a hardware processor coupled to the transmitter and the receiver and configured to establish a MBMS connection for receiving a MBMS data, receive, through the receiver, the MBMS data after establishing the MBMS connection, determine a feedback resource based on receiving the MBMS data, and transmit, through the transmitter, a feedback message to indicate a reliability of the MBMS connection by using the feedback resource.

In another aspect, the disclosure is directed to a base station which includes not limited to a transmitter, a receiver, and a hardware processor coupled to the transmitter and the receiver and configured to establish a MBMS connection for multicasting a MBMS data, multicast, through the transmitter, the MBMS data after establishing the MBMS connection, receive, through the receiver, a feedback message indicating a reliability of the MBMS connection from a feedback resource, and determine whether to re-transmit the MBMS data based on the feedback message.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present exemplary embodiments of the disclosure, examples of which are illustrated in the accompanying drawings. Wherever possible, the same reference numbers are used in the drawings and the description to refer to the same or like parts.

In LTE, MBMS (Multimedia Broadcast Multicast Service) related function has been specified. However, different from unicast traffic which is delivered from one transmitter (TX) to one receiver (RX), since MBMS is used to deliver the traffic from one TX to multiple RX, it is not straightforward to expect feedback from the said multiple RX. Therefore, LTE did not specify the feedback mechanism for MBMS, and instead, the network has to rely on autonomous re-transmission and link adaptation to ensure reliability.

However, without feedback from RX side, autonomous re-transmission and link adaptation is not reliable enough, e.g., it may either cause unnecessary re-transmission or too-low MCS level, i.e., resource waste, or insufficient re-transmission or too-high MCS level, i.e., data loss. Considering that, this disclosure is to introduce feedback for MBMS function.

This disclosure provides embodiments on feedback-assisted MBMS, where the first embodiment is for hybrid automatic repeat request (HARQ) ACK/NACK based feedback, while the second one is for CSI based feedback.

Embodiment 1: HARQ ACK/NACK Based Feedback

In this embodiment, based on the received DL MBMS data, UE provides HARQ ACK/NACK feedback to network, which is used by network to decide on possible HARQ re-transmission.

Firstly, one issue is how for the UE to get the feedback resource. For this issue, the feedback resource can be obtained from at least one of the following:
  Implicitly mapped from resource location (time, frequency and/or code domain) of control channel/information/element and/or data channel;
  Explicitly indicated in control channel/information/element, MAC CE and/or RRC (dedicated RRC and/or SIB);

For the indicated resource for feedback, it can be either UE-specific resource, i.e., different UE using different resource to feedback, or common resource, i.e., different UE using same resource to feedback. The two methods can be mixed, e.g., the UEs can be divided into different groups, and a same resource is used for UEs in the same group, but different resources are used for UEs in different groups.

For the indicated resource for feedback, it can be either separated resource for ACK and NACK, or just resource for NACK, i.e., no resource for ACK.

For the indicated resources for feedback, it can be resource in time, frequency, and/or code domain.

For the indicated resource, different types of UE may perform the feedback in different ways, e.g.,
  UEs in different radio resource control (RRC) state (e.g., RRC_INACTIVE, RRC_IDLE, RRC_CONNECTED) may feedback in different ways;
  UEs in different location (e.g., different zones, different range from a reference location point) may feedback in different ways;
  UEs receiving different MBMS flow/session/channel/traffic may feedback in different ways;

With respect to the feedback in different ways, it includes but not limited to one of the aspects mentioned above, i.e., UE-specific or common resource, separated ACK/NACK resource or NACK resource only. Furthermore, it can be just whether to provide feedback or not.

Secondly, another issue is how for the network to schedule HARQ (re-)transmission. On the one hand, one or more HARQ process may be used for MBMS data reception. Furthermore, it can be reserved specifically for the MBMS reception, i.e., separated from the HARQ process which is used for unicast data reception. On the other hand, NDI (New Data Indicator) can be used to indicate whether the HARQ transmission is new transmission or re-transmission, for a specific HARQ process.

Embodiment 2: CSI Based Feedback

In this embodiment, UE provides CSI feedback to network, including CQI, PMI and/or RI, which is used by network to decide on MCS, multiple input multiple output (MIMO) scheme and etc.

Firstly, one issue is how for the UE to get the feedback resource. For this issue, the feedback resource can be obtained from at least one of the following:
  Implicitly mapped from resource location (time, frequency and/or code domain) of control channel/information/element and/or data channel;
  Explicitly indicated in control channel/information/element, media access control (MAC) control element (CE) and/or RRC (dedicated RRC and/or system information block (SIB));

For the indicated resource for feedback, it can be either UE-specific resource, i.e., different UE using different resource to feedback, or common resource, i.e., different UE using same resource to feedback, e.g., to indicate a higher or a lower MCS scheme/rank is expected. The two methods can be mixed, e.g., the UEs can be divided into different groups, and a same resource is used for UEs in the same group, but different resources are used for UEs in different groups.

For the indicated resources for feedback, it can be resource in time, frequency, and/or code domain.

For the indicated resource, different types of UE may perform the feedback in different ways, e.g., UEs in different RRC state (e.g., RRC_INACTIVE, RRC_IDLE, RRC_CONNECTED) may feedback in different ways;

UEs in different location (e.g., different zones, different range from a reference location point) may feedback in different ways;

UEs receiving different MBMS flow/session/channel/traffic may feedback in different ways;

With respect to the feedback in different ways, it includes but not limited to one of the aspects mentioned above, i.e., UE-specific or common resource. Furthermore, it can be just whether to provide feedback or not.

The disclosed embodiments provide methods for UE to provide feedback for MBMS traffic which may have the following characteristics.

The feedback can be HARQ ACK/NACK feedback and/or CSI feedback.

The feedback resource can be obtained from at least one of the following:

Implicitly mapped from resource location (time, frequency and/or code domain) of control channel/information/element and/or data channel;

Explicitly indicated in control channel/information/element, MAC CE and/or RRC (dedicated RRC and/or SIB);

The feedback resource can be UE-specific and/or common resource.

The feedback resource can be either separated resource for ACK and NACK, or just resource for NACK, i.e., no resource for ACK.

The feedback resource can be resource in time, frequency, and/or code domain.

For the indicated resource, different types of UE may perform the feedback in different ways, e.g., UEs in different RRC state (e.g., RRC_INACTIVE, RRC_IDLE, RRC_CONNECTED) may feedback in different ways;

UEs in different location (e.g., different zones, different range from a reference location point) may feedback in different ways;

UEs receiving different MBMS flow/session/channel/traffic may feedback in different ways;

where the feedback in different ways, it includes but not limited to, UE-specific or common resource, separated ACK/NACK resource or NACK resource only. Furthermore, it can be just whether to provide feedback or not.

The disclosure provides a UE, a base station, and a method used by the UE and by the base station for implementing a feedback assisted multicast. As previously described, the current communication system such as LTE and beyond has not specified a feedback mechanism between a base station and multiple UEs when the base station has established with the multiple UEs a multicast session which could be, for example, a MBMS session, a e-MBMS session, or beyond. Thus, the disclosure improves the current communication system by providing a feedback assisted multicast mechanism.

Figure 3:
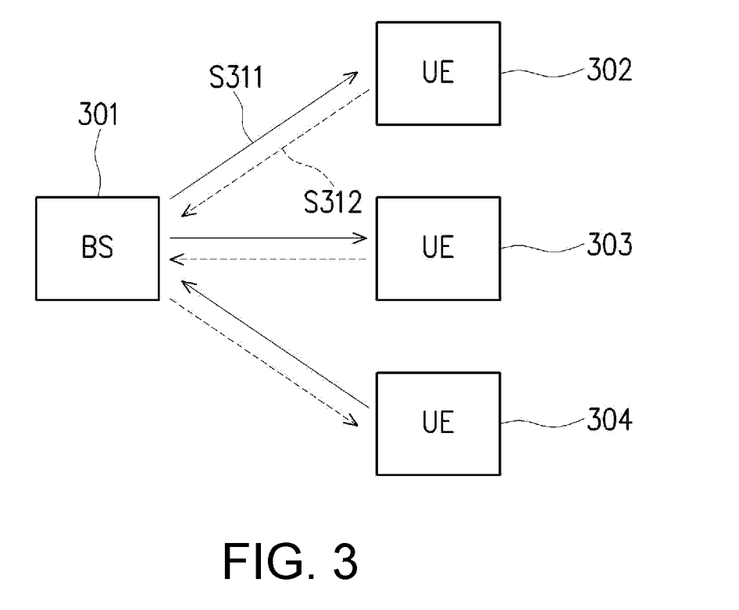
FIG. 3 shows a conceptual diagram of implementing a feedback assisted multicast according to an exemplary embodiment of the disclosure.

Referring to FIG. 3 which shows a concept implementing a feedback assisted multicast. Assuming that multiple UEs 302, 303, 304 have established MBMS connections with the core network through the base station (BS) 301, during the MBMS session, the eNB could then multicast multimedia data (e.g. MBMS data) to the UEs 302, 303, 304 (S311). Based on receiving the downlink (DL) MBMS data, each UE 302, 303, 304 may provide a feedback message to the core network through the BS 301 (S312). The purpose of the feedback message is to indicate the reliability of the MBMS connection between a particular UE 302, 303, 304 and the BS 301. Based on the feedback message, the BS 301 may determine whether to perform a re-transmission of the multimedia data to a UE 302, 303, 304 based on the feedback message from the UE 302, 303, 304. However, there remains couple issues to be resolved in order to implement the feedback assisted multicast. One is how a resource could be obtained by the UE 302, 303, 304 to transmit the feedback message, and the other is the manner of implementing the feedback message by modifying existing mechanisms so that a massive overhaul would not be required.

Figure 4:
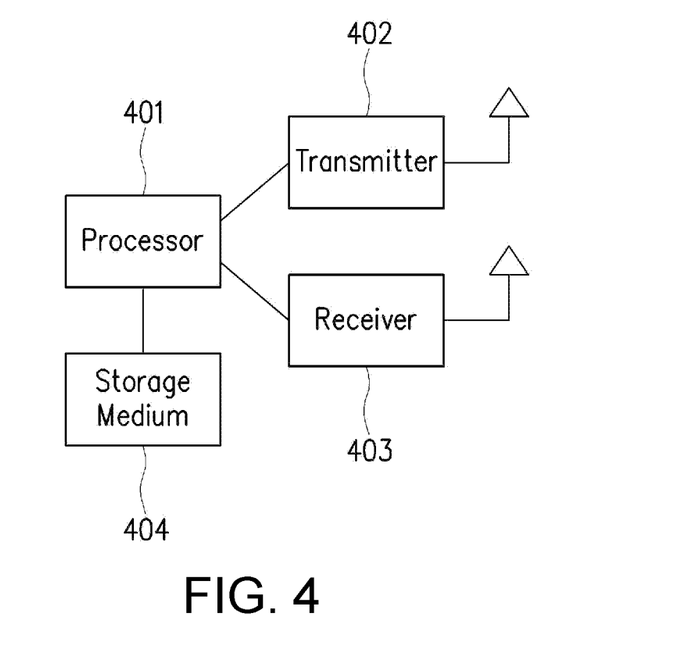
FIG. 4 shows a hardware block diagram of a UE according to an exemplary embodiment of the disclosure.

In order to realize the feedback assisted multicast, the disclosure provides a UE for implementing the feedback assisted multicast. FIG. 4 shows a hardware block diagram of an exemplary UE. The hardware of the UE would include not limited to a hardware processor 401, a transmitter 402, a receiver 403, and a non-transitory storage medium 404. The transmitter 402 and the receiver 403 could be integrated as a transceiver or separated into individual components. The hardware processor 401 could be configured to control the transmitter 402, the receiver 403, and the non-transitory storage medium 403 for implementing the method of feedback assisted multicast including its exemplary embodiments and alternative variations to be described latter part of the disclosure. This disclosure is compatible with the LTE communication system, LTE-A communication system, the 5G communication system, and potentially the communication system beyond 5G.

The hardware of the transmitter 402 and the receiver 403 may include one or more transmitters and receivers configured to transmit and receive signals respectively in the radio frequency or in the mmWave frequency. The hardware of the transmitter 402 and the receiver 403 may also perform operations such as low noise amplifying, impedance matching, frequency mixing, up or down frequency conversion, filtering, amplifying, and so forth. The hardware of the transmitter 402 and the receiver 403 may each further include or coupled to one or more analog-to-digital (A/D) or digital-to-analog (D/A) converters which are configured to convert from an analog signal format to a digital signal format during uplink signal processing and from a digital signal format to an analog signal format during downlink signal processing. The transmitter 402 and the receiver 403 may further include an antenna array which may include one or multiple antennas to respectively transmit and receive omni-directional antenna beams or directional antenna beams.

The hardware processor 401 is configured to access to the non-transitory storage medium 404 which stores programming codes, codebook configurations, buffered data, and record configurations assigned by the hardware processor 401. The hardware processor 401 could be implemented by using programmable units such as a micro-processor, a micro-controller, a DSP chips, FPGA, etc. The functions of the hardware processor 401 may also be implemented with separate electronic devices or ICs. It should be noted that the functions of hardware processor 401 may be implemented with either hardware or software.

Figure 5:
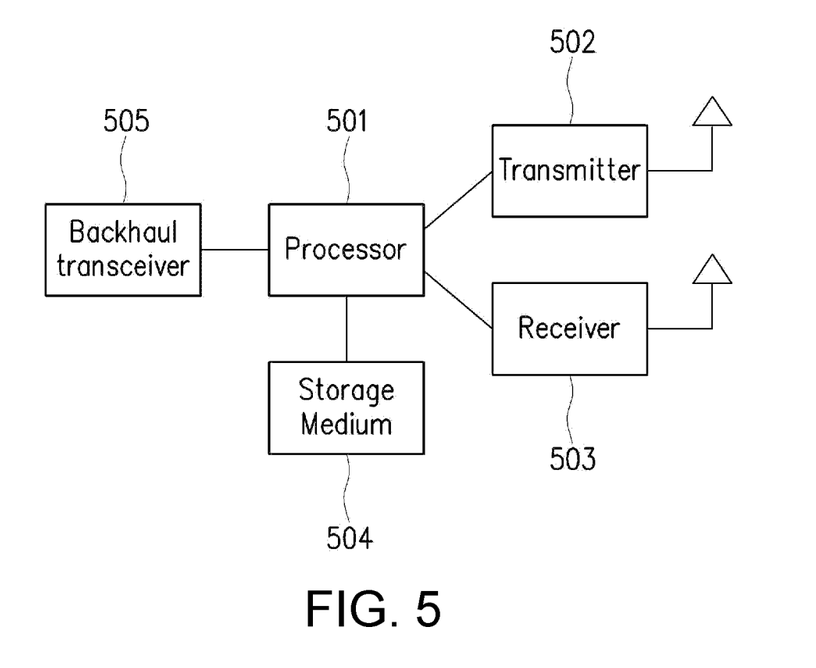
FIG. 5 shows a hardware block diagram of a base station according to an exemplary embodiment of the disclosure.

FIG. 5 shows a hardware block diagram of an exemplary base station. The hardware of the UE would include not limited to a hardware processor 501, a transmitter 502, a receiver 503, a non-transitory storage medium 504, and a backhaul transceiver module 505. The transmitter 502 and the receiver 503 could be integrated as a transceiver or separated into individual components. The hardware processor 501 could be configured to control the transmitter 502, the receiver 503, the non-transitory storage medium 503, and the transceiver module 505, for implementing the method of feedback assisted multicast including its exemplary embodiments and alternative variations to be described latter part of the disclosure. This disclosure is compatible with the LTE communication system, LTE-A communication system, the 5G communication system, and potentially the communication system beyond 5G.

The hardware of the transmitter 502 and the receiver 503 may include one or more transmitters and receivers configured to transmit and receive signals respectively in the radio frequency or in the mmWave frequency. The hardware of the transmitter 502 and the receiver 503 may also perform operations such as low noise amplifying, impedance matching, frequency mixing, up or down frequency conversion, filtering, amplifying, and so forth. The hardware of the transmitter 502 and the receiver 503 may each further include or coupled to one or more analog-to-digital (A/D) or digital-to-analog (D/A) converters which are configured to convert from an analog signal format to a digital signal format during uplink signal processing and from a digital signal format to an analog signal format during downlink signal processing. The transmitter 502 and the receiver 503 may further include an antenna array which may include one or multiple antennas to respectively transmit and receive omni-directional antenna beams or directional antenna beams.

The hardware processor 501 is configured to access to the non-transitory storage medium 504 which stores programming codes, codebook configurations, buffered data, and record configurations assigned by the hardware processor 501. The hardware processor 501 could be implemented by using programmable units such as a micro-processor, a micro-controller, a DSP chips, FPGA, etc. The functions of the hardware processor 501 may also be implemented with separate electronic devices or ICs. It should be noted that the functions of hardware processor 501 may be implemented with either hardware or software.

The backhaul transceiver module 505 includes one or more transceiver modules as each transceiver module may establish one or more connections for implementing a particular communication interface such as M1 interface, M2 interface, X2 interface, 51 interface, and etc.

Figure 6:
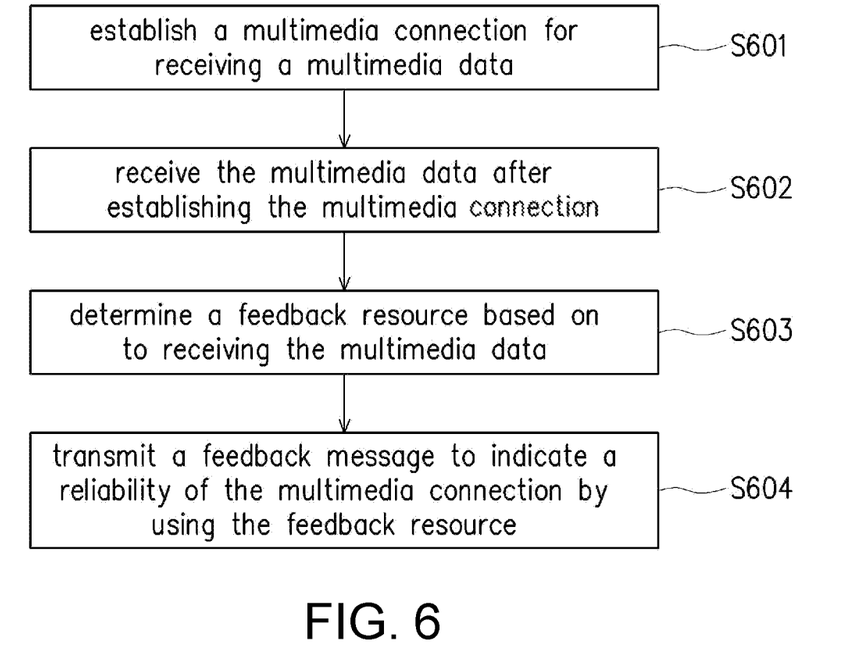
FIG. 6 is a flow chart which illustrates a method used by a UE for implementing a feedback assisted multicast according to an exemplary embodiment of the disclosure.

FIG. 6 shows a method used by a UE for implementing a feedback assisted multicast. It is worth nothing that the steps of FIG. 6 are described from the perspective of a UE but are not necessarily limited to this particular sequence. In step S601, the UE may establish a multimedia connection for receiving a multimedia data. The multimedia connection could be for establishing, for example, a MBMS session/connection, an e-MBMS session/connection, and etc. The multimedia data could be, for example, MBMS data, e-MBMS data, and etc. The multimedia connection could be a MBMS session/connection which is conducted via a multicast transmission from an eNB to multiple UEs. In step S602, the UE would receive multimedia data from the core network through the eNB after the multimedia connection has been established. In step S603, the UE would determine a feedback resource for transmitting a feedback message to the eNB based on receiving the multimedia data. The feedback resource could be determined based on an implicit mapping between a predetermined physical resource and the feedback message or explicitly indicated from the eNB. The feedback message could be implemented based on an acknowledge (ACK) and negative acknowledgment (NACK) feedback mechanism or a channel state information (CSI) feedback mechanism. In step S604, the UE would transmit the feedback message to the eNB by using the feedback resource. The feedback message would inform the eNB and/or the core network the reliability of the MBMS connection between the UE and the eNB so that the eNB may determine whether to send a re-transmission to the UE or to update or to change the MBMS connection. More details will be further provided in latter part of the disclosure.

Figure 7:
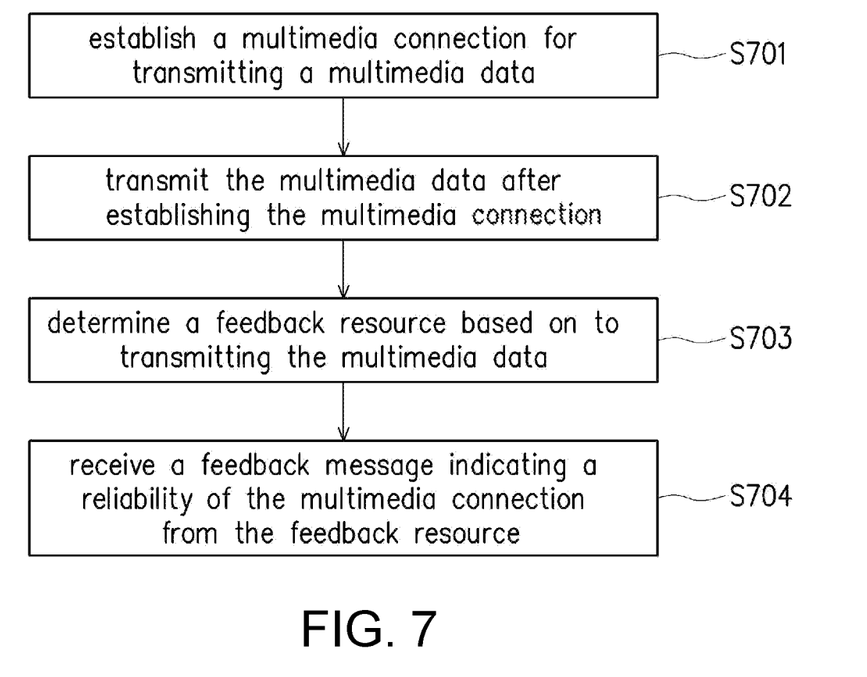
FIG. 7 is a flow chart which illustrates a method used by a base station for implementing a feedback assisted multicast according to an exemplary embodiment of the disclosure.

FIG. 7 shows a flow chart which illustrates a method used by a base station for implementing a feedback assisted multicast. It is worth nothing that the steps of FIG. 7 are described from the perspective of a base station but are not necessarily limited to this particular sequence. The base station could be any base station that is capable of implementing the MBMS session or e-MBMS session such as an eNB, a gNB, a network access point, a network hotspot, a small or home base station, and etc. In step S701, the base station may establish a multimedia connection for transmitting a multimedia data from the core network to at least one UE. The multimedia connection could be for establishing, for example, a MBMS session/connection, an e-MBMS session/connection, and etc. The multimedia data could be, for example, MBMS data, e-MBMS data, and etc. The multimedia connection could be a MBMS session/connection which is conducted via a multicast transmission from the base station to multiple UEs. In step S702, the base station would transmit multimedia data from the core network to the multiple UEs after the multimedia connection has been established. In step S703, the base station would determine a feedback resource based on transmitting a feedback message so that the base station would be able to receive the feedback message from the feedback resource. The feedback resource could be determined based on foreknowledge as an intrinsic mapping exists between a predetermined physical resource and the feedback message. The feedback resource may also be explicitly indicated from the base station to the UEs. The feedback message could be implemented based on an acknowledge (ACK) and negative acknowledgment (NACK) feedback mechanism or a channel state information (CSI) feedback mechanism. In step S704, the base station would receive the feedback message from the UE by using the feedback resource.

Similar to the UE, the feedback message would inform base station or the core network the reliability of the MBMS connection between the UE and the base station so that the base station may determine whether to send a re-transmission to the UE or to update or to change the MBMS connection. A re-transmission of the multimedia data to a particular UE may occur based on receiving a NACK feedback message from the UE or based on receiving a CQI from the particular UE which indicates that the multimedia connection between the base station and the particular UE as being unreliable. More details will be further provided in latter part of the disclosure.

Figure 8:
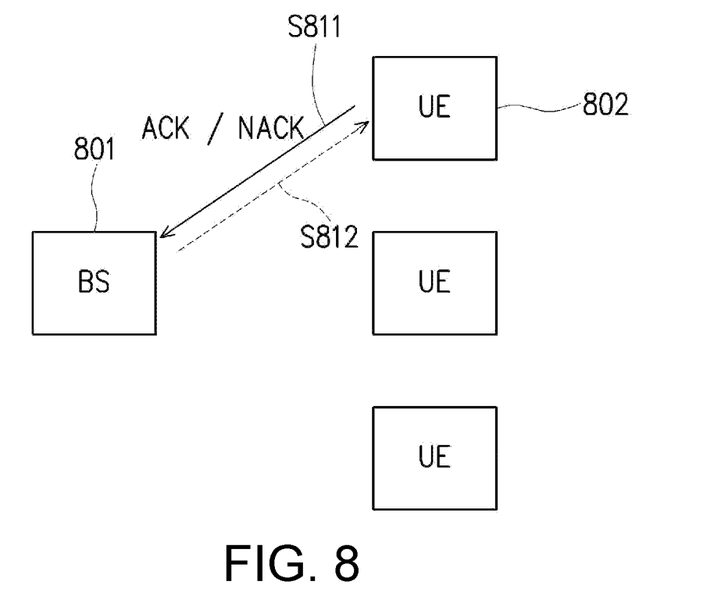
FIG. 8 shows a conceptual diagram of using acknowledge (ACK)/negative acknowledgment (NACK) to implement a feedback assisted multicast according to an exemplary embodiment of the disclosure.

The exemplary embodiment of using the HARQ ACK/NACK feedback mechanism as a feedback message to implement a feedback assisted multicast is shown in FIG. 8. The HARQ ACK/NACK feedback mechanism may include the type I HARQ mechanism, type II HARQ mechanism, HARQ with soft combining, and other types of HARQ mechanisms. In general, based on having reliably received the multimedia data (e.g. MBMS data), the UE 802 would transmit an ACK message as a feedback message to the BS 801. However, if the UE 802 is unable to reliably decode the MBMS data, the UE 802 would transmit a NACK message as the feedback message to the BS 801 (S811). Based on receiving the feedback message, the BS 801 may decide to re-transmit the same MBMS data to the UE 802 if the NACK message was the feedback message (S812). It would not be necessary to re-transmit the same MBMS data to the UE 802 if the ACK message was the feedback message. However, in an alternative exemplary embodiment, the ACK message is never transmitted by the UE 802, and the multimedia data is assumed to be reliably received if the NACK message is not transmitted by the UE 802.

Figure 9:
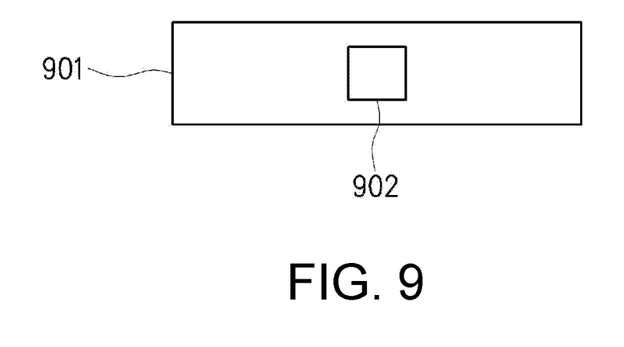
FIG. 9 shows a conceptual diagram of allocating a resource to implement a feedback assisted multicast according to an exemplary embodiment of the disclosure.

However, before transmitting the feedback message, both the UE and the eNB has to know which feedback resource is to be used to transmit the feedback message. The conceptual diagram of allocating a feedback resource to implement a feedback assisted multicast is shown in FIG. 9. Assuming that a pool of physically resource 901 is available between one or more UEs and the eNB, a feedback resource 902 could be allocated for transmitting a feedback message. The feedback resource 902 could be a physical radio resource in the time domain, in the frequency domain, or in the code domain. The feedback resource 902 could be determined in at least two ways, namely, by implicit mapping and/or by explicit indication. First, there could be an implicit mapping between the feedback message and a physical radio resource location 902 in terms of time, frequency and/or code domain of a control channel, a control information, a control element and/or a data channel. In other words, the feedback resource 902 would be allocated for transmitting the feedback message, and the location of the feedback resource 902 could be predetermined and inherently known between the eNB and the UE. Second, the feedback resource could be explicitly indicated in a control channel, in a control information, in a control element, in a media access control (MAC) control element (CE), in a radio resource control (RRC) message, and/or in a system information block (SIB). In other words, the location of the feedback resource 902 is not predetermined or inherently known between the eNB and the UE, but the eNB would transmit a configuration message to indicate the feedback resource 902.

In one exemplary embodiment, the feedback resource could be a UE-specific resource so that each specific UE would use a different feedback resource. Alternatively, the same feedback resource could be used by a plurality of UEs. For example, all UEs under the same MBMS session may share the same feedback resource. Alternatively, UEs could be divided into multiple groups, and each of the multiple groups may use a different feedback resource. Alternatively, a combination of all the above described techniques could be used to allocate feedback resources, and the above techniques are compatible with the ways of determining feedback resources by implicit mapping and/or by explicit indication as previously described. For example, one or more UEs may have its own unique feedback resource, one or more other UEs may share a feedback resource, and multiple UEs could be divided into groups with each group sharing a unique feedback resource.

In one exemplary embodiment, ACK and NACK messages could be transmitted in two different feedback resources. Alternatively, both ACK and NACK messages could be transmitted in the same feedback resource. Or alternatively, only NACK messages may require a feedback resource and there would be no feedback resource allocated for ACK messages. Or alternatively, only ACK messages may require a feedback resource and there would be no feedback resource allocated for NACK messages.

The feedback resources for the ACK/NACK messages may also be allocated for UEs in different circumstances. In one exemplary embodiment, UEs in different RRC states could be allocated with different feedback resources. For example, UEs in the RRC_INACTIVE state could be allocated with different feedback resources from UEs in the RRC_IDLE state, and UEs in the RRC_IDLE state could be allocated with different feedback resources from UEs in the RRC_CONNECTED state. Alternatively, UEs in two of the RRC states could be allocated with different feedback resources from UEs in at least one other RRC state. In one exemplary embodiment, UEs in different locations could be allocated with different feedback resources. The different locations could be different physical locations, different zones, or different ranges from a reference location point. In one exemplary embodiment, UEs in different MBMS traffic could be allocated with different feedback resources. The different MBMS traffic may mean different MBMS sessions, different MBMS channels, or different MBMS flows. However, the ways of allocating feedback resources may not be limited to one of the aspects described above. For instance, any one of the ways of allocating feedback resources could be for the ACK message only or for the NACK message only. Alternatively, the feedback resource might not be for transmitting a feedback message but merely to indicate whether the UE will provide a feedback message or not.

Figure 10:
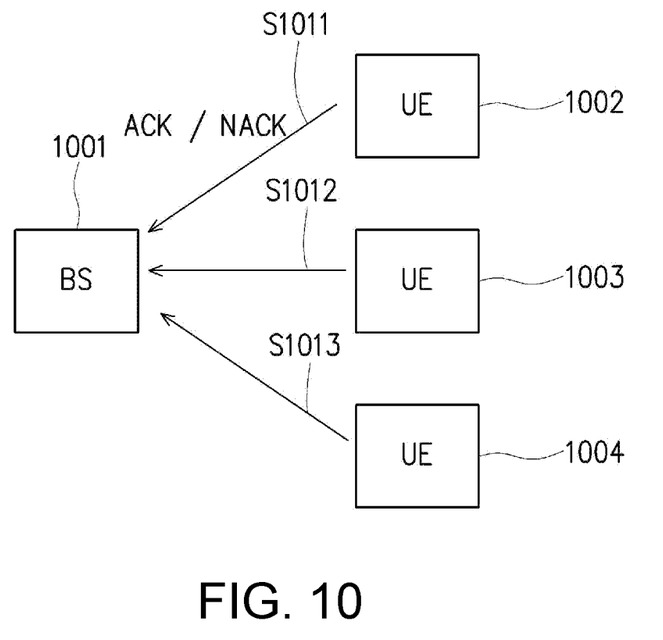
FIG. 10 shows a conceptual diagram of handing ACK/NACK based feedbacks for different UEs in different ways according to an exemplary embodiment of the disclosure.

An example of different UEs handling the feedback messages differently is shown in FIG. 10. Assuming that a base station (BS) 1001 is multicasting a MBMS data to a plurality of UEs including a first UE 1002, a second UE 1003, and a third UE 1004. For example, the first UE 1002 and the second UE 1003 may transmit the ACK message or the NACK messages in different feedback resources since they are in different RRC state, in different locations, and/or in different MBMS traffic (S1011, S1012). For example, the second UE 1003 and the third UE 1004 may transmit the ACK message or the NACK messages in different feedback resources since they are in different groups (S1012, S1013). For another example, the first UE 1002 may use a feedback resource to transmit both ACK and NACK messages (S1011), but the third UE 1004 may use the same feedback resource to only transmit a NACK messages (S1013). However, the disclosure is not limited to the above described examples.

In one exemplary embodiment, one or more HARQ processes could be used per MBMS data reception. Furthermore, one or more HARQ processes could be specifically reserved for each MBMS reception. In other words, the one or more specifically reserved HARQ processes for MBMS multicast data receptions are separated from the HARQ processes which are used for unicast data receptions. In one exemplary embodiment, a new data indicator (NDI) could be used to indicate whether a HARQ transmission is new transmission or a re-transmission, for a specific HARQ process.

Figure 11:
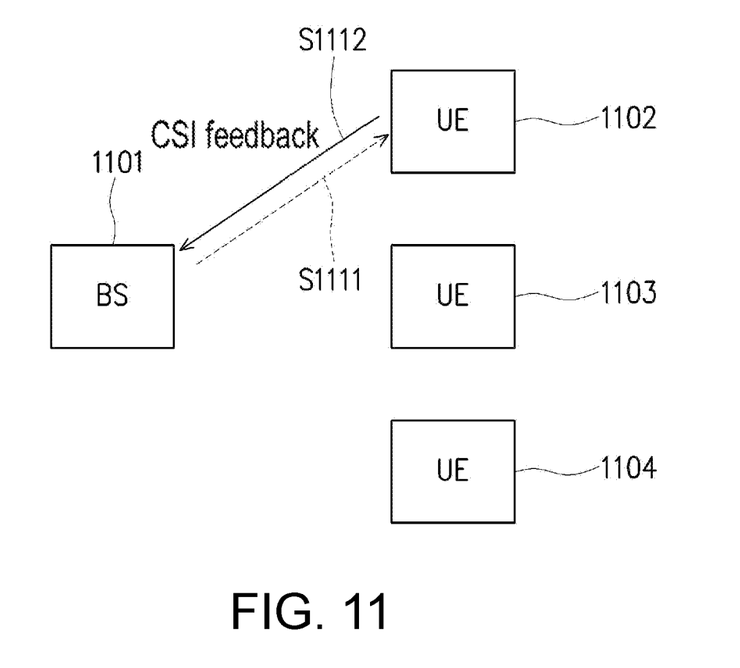
FIG. 11 shows a conceptual diagram of using channel state information (CSI to implement a feedback assisted multicast according to an exemplary embodiment of the disclosure.

Alternative to the ACK/NACK feedback mechanism, the exemplary embodiment of using the CSI feedback mechanism as a feedback message to implement the feedback assisted multicast is shown in FIG. 11. A CSI feedback message may include a channel quality indicator (CQI), a pre-coding matrix indicator (PMI), and/or a rank indicator. The CQI could be an integer to indicate the channel quality of a physical downlink shared channel (PDSCH). PMI is used to indicate the index of a codebook. Thus, after a base station (BS) 1101 transmitting the MBMS data (S1111), the UE 1102 may transmit a CSI feedback message to the base station (S1112), and from the CSI feedback message, the base station 1101 would be able to know the reliability of the MBMS connection through which the MBMS data is transmitted. If the CSI feedback message indicates that a MBMS connection is unreliable, the base station 1101 may retransmit the same multimedia data to a UE 1102 (i.e. repeat S811).

Before transmitting the feedback message, both the UE and the eNB has to know which feedback resource is to be used to transmit the CSI feedback message. FIG. 9 is also applicable to concept of allocating a feedback resource to implement the CSI feedback message. Assuming that a pool of physically resource 901 is available between one or more UEs and the eNB, a feedback resource 902 could be allocated for transmitting the CSI feedback message. The feedback resource 902 could be a physical radio resource in the time domain, in the frequency domain, or in the code domain. The feedback resource 902 could be determined in at least two ways, namely, by implicit mapping and/or by explicit indication. First, there could be an implicit mapping between the feedback message and a physical radio resource location 902 in terms of time, frequency and/or code domain of a control channel, a control information, a control element and/or a data channel. In other words, the feedback resource 902 would be allocated for transmitting the CSI feedback message, and the location of the feedback resource 902 could be predetermined and inherently known between the eNB and the UE. Second, it could be explicitly indicated in a control channel, in a control information, in a control element, in a MAC CE, in an RRC message, and/or in a SIB. In other words, the location of the feedback resource 902 is not predetermined or inherently known between the eNB and the UE, but the eNB would transmit a configuration message to indicate the feedback resource 902.

In one exemplary embodiment, the feedback resource could be a UE-specific resource so that each specific UE would use a different feedback resource. Alternatively, the same feedback resource could be used by a plurality of UEs to indicate a higher modulation and coding scheme (MCS) scheme or rank or a lower MCS scheme or rank. For example, all UEs under the same MBMS session may share the same feedback resource. Alternatively, UEs could be divided into multiple groups, and each of the multiple groups may use a different feedback resource. Or alternatively, a combination of all the above described techniques could be used to allocate feedback resources for CSI feedback messages, and the above techniques are compatible with the ways of determining feedback resources by implicit mapping and/or by explicit indication as previously described. For example, one or more UEs may have its own unique feedback resource, one or more other UEs may share a feedback resource, and multiple UEs could be divided into groups with each group sharing a unique feedback resource.

The feedback resources for a CSI feedback message may also be allocated for UEs in different circumstances. In one exemplary embodiment, UEs in different RRC states could be allocated with different feedback resources. For example, UEs in the RRC_INACTIVE state could be allocated with different feedback resources from UEs in the RRC_IDLE state, and UEs in the RRC_IDLE state could be allocated with different feedback resources from UEs in the RRC_CONNECTED state. Alternatively, UEs in two of the RRC states could be allocated with different feedback resources from UEs in at least one other RRC state. In one exemplary embodiment, UEs in different locations could be allocated with different feedback resources. The different locations could be different physical locations, different zones, or different ranges from a reference location point. In one exemplary embodiment, UEs in different MBMS traffic could be allocated with different feedback resources. The different MBMS traffic may mean different MBMS sessions, different MBMS channels, or different MBMS flows. For example, if two different sets of multimedia data are transmitted to two different UEs, the UEs could be considered to have received different MBMS traffic. However, the ways of allocating feedback resources may not be limited to one of the aspects described above. For instance, the feedback resource might not be for transmitting a feedback message but merely to indicate whether the UE will provide a feedback message or not.

Figure 12:
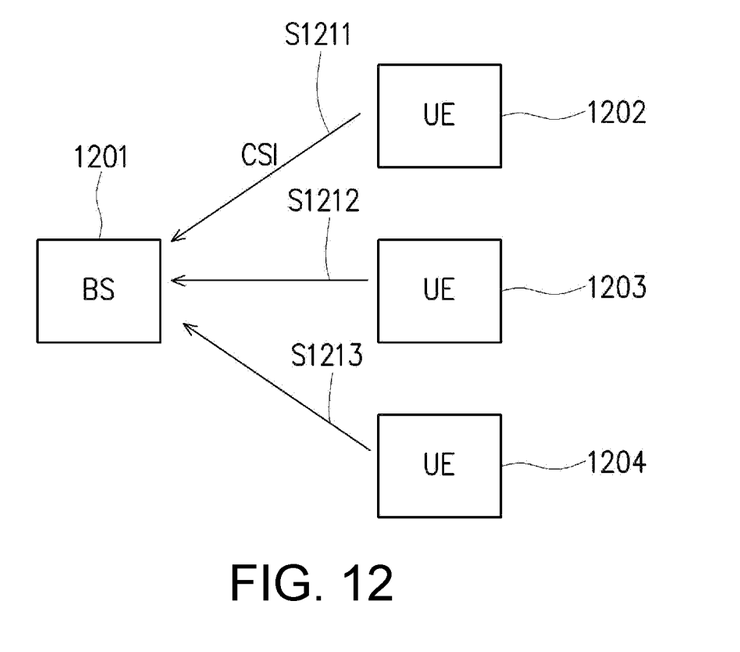
FIG. 12 shows a conceptual diagram of handing CSI based feedbacks for different UEs in different ways according to an exemplary embodiment of the disclosure.

An example of different UEs handling the feedback messages differently is shown in FIG. 12. Assuming that a base station (BS) 1201 is multicasting a MBMS data to a plurality of UEs including a first UE 1202, a second UE 1203, and a third UE 1204. For example, the first UE 1202 and the second UE 1203 may transmit the CSI feedback messages in different feedback resources since they are in different RRC state, in different locations, and/or in different MBMS traffic (S1211 and S1212). For example, the second UE 1203 and the third UE 1204 may transmit the CSI feedback messages in different feedback resources since they are in different groups (S1212 and S1213). For example, the first UE 1202 may use a feedback resource to transmit CSI feedback messages (S1211), but the third UE 1004 may use the same feedback resource to only indicate that a CSI feedback message will be sent (S1213). FIG. 12 only serves as an example, and the disclosure is not limited to the example of FIG. 12.

Overall, the disclosure provides a method and network devices to implement feedback assisted multicast such as MBMS, e-MBMS, and beyond. The feedback message could be a HARQ ACK/NACK based feedback or a CSI based feedback. The feedback resource used to transmit the feedback message could be explicitly indicated or implicitly mapped between the feedback message and a physical radio resource which could be a time slot, a carrier frequency, and/or a code domain of a control channel, a control information, a CE, or a data channel. The explicit indication could be accomplished through a control channel, a control information, a CE, a MAC CE, an RRC signaling, or a SIB. A feedback resource could be specifically used per UE or share among multiple UEs. A different feedback resource could be allocated for transmitting the ACK and NACK messages, or a feedback resource is only used to transmit a NACK message but not an ACK message. The feedback resources could be allocated differently based on UEs under different circumstances such as UEs in different RRC state are allocated with different feedback resources, UE in different locations are allocated with different feedback resources, and UEs in different MBMS traffic are allocated with different feedback resources.

In view of the aforementioned descriptions, the disclosure is suitable for being used in a wireless communication system including LTE, LTE-A, 5G, and beyond, and is able to implement feedback assist multicast so as to allow UEs to provide feedbacks to a base station to indicate the reliability of a multimedia connection so as to reduce unnecessary re-transmissions, to reduce resource wastes, and to allow the communication system to more accurately adopt the proper MCS level.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items", individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A user equipment (UE) comprising:
   a transmitter;
   a receiver; and
   a hardware processor coupled to the transmitter and the receiver and configured to:
   establish a multimedia broadcast multimedia service (MBMS) connection for receiving a MBMS data;
   receive, through the receiver, the MBMS data after establishing the MBMS connection;
   determine a feedback resource for responding to the MBMS data which has been received; and
   transmit, through the transmitter, a feedback message comprising a hybrid automatic repeat request (HARQ) message to indicate a reliability of the MBMS connection based on the MBMS data which has been received, wherein the HARQ message comprises a negative acknowledgment (NACK) message, the feedback resource is used to transmit the NACK message, and there is no feedback resource allocated to transmit an acknowledgment (ACK) message.

2. The UE of claim 1, wherein the hardware processor is further configured to receive, through the receiver, a re-transmission of the MBMS data based on transmitting the NACK message.

3. The UE of claim 1, wherein the hardware processor is configured to determine the feedback resource comprising:
   determine the feedback resource for the feedback message based on an implicit mapping between the feedback message and a physical radio resource location; and
   determine the feedback resource for the feedback message based on an explicit signaling when the implicit mapping does not exist.

4. A communication method comprising:
   establishing, by a user equipment (UE), a multimedia broadcast multimedia service (MBMS) connection for receiving a MBMS data;
   receiving, by the UE, the MBMS data after establishing the MBMS connection;
   determining, by the UE, a feedback resource for responding to the MBMS data which has been received, wherein the HARQ message comprises a negative acknowledgment (NACK) message, the feedback resource is used to transmit the NACK message, and there is no feedback resource allocated to transmit an acknowledgment (ACK) message; and
   transmitting, by the UE, a feedback message comprising a hybrid automatic repeat request (HARQ) message to indicate a reliability of the MBMS connection based on the MBMS data which has been received.

5. The communication method of claim 4, further comprising:
   receiving, by the UE, a re-transmission of the MBMS data based on transmitting the NACK message.

6. A base station comprising:
   a transmitter;
   a receiver; and
   a hardware processor coupled to the transmitter and the receiver and configured to:
   establish a multimedia broadcast multimedia service (MBMS) connection for multicasting a MBMS data;
   multicast, through the transmitter, the MBMS data after establishing the MBMS connection;
   receive, through the receiver, a feedback message comprising a hybrid automatic repeat request (HARQ) message indicating a reliability of the MBMS connection from a feedback resource, wherein the HARQ message comprises a negative acknowledgment (NACK) message, the feedback resource is used to transmit the NACK message, and there is no feedback resource allocated to transmit an acknowledgment (ACK) message; and
   determine whether to re-transmit the MBMS data based on the feedback message.

7. The base station of claim 6, wherein the hardware processor is further configured to transmit, through the transmitter, a re-transmission of the MBMS data to the MBMS connection based on the NACK message which has been received.

8. The base station of claim 6, wherein the hardware processor is further configured to determine the feedback resource for the feedback message based on an implicit mapping between the feedback message and a physical radio resource location; and
   transmit, through the transmitter, a signaling to configure the feedback resource for the feedback message when the implicit mapping does not exist.

* * * * *